Patented Nov. 16, 1943

2,334,565

UNITED STATES PATENT OFFICE 2,334,565

LUBRICATING COMPOSITION AND POUR DEPRESSOR THEREFOR

Eugene Lieber, West New Brighton, Staten Island, and Marvin E. Thorner, Brooklyn, N. Y., assignors to Standard Oil Development Company, a corporation of Delaware No Drawing. Application October 31, 1941, Serial No. 417,312

11 Claims. (Cl. 252—53)

This invention relates to a novel type of polymerization products and to methods of preparing such products and using them, more particularly as pour depressors in waxy lubricating oils.

This application is a continuation-in-part of application Serial No. 343,152, filed June 29, 1940, now issued as Patent No. 2,274,864, dated March 3, 1942, for Eugene Lieber and Marvin E. Thorner.

Contrary to the prior art, it has now been found that effective pour depressors for waxy oils can be prepared by the polymerization of low molecular weight alcohols containing less than 8 carbon atoms, by means of catalysts of the Friedel-Crafts type.

The alcohols to be used include the lower saturated aliphatic alcohols of 7 carbon atoms and less, of which the following are typical examples: methyl alcohol, ethyl alcohol, normal propyl alcohol, isopropyl alcohol, the butyl alcohols, such as normal butyl alcohol, isobutyl alcohol, secondary butyl alcohol, the amyl alcohols, such as n-butyl carbinol, sec-butyl carbinol, dimethyl ethyl carbinol, methyl propyl carbinol, and the hexyl alcohols. These may be used singly or in combination. In particular we have found the mixed amyl alcohols of commerce to be particularly useful. Other mixed alcohols may be used, such as those obtained, for instance, by hydration of a mixture of normally gaseous olefins, e. g. as obtained in the gaseous products formed during the cracking of heavier normally liquid petroleum fractions of the kerosene, gas oil or lubricating oil boiling range. In addition to the saturated aliphatic alcohols, one can also use unsaturated aliphatic alcohols having less than 8 carbon atoms such as allyl alcohol and furyl alcohol as well as cyclo aliphatic alcohols such as cyclo hexanol and methyl-cyclohexenol.

Instead of the above-mentioned monohydric alcohols one may also use polyhydroxy alcohols, such as ethylene glycol, propylene glycol, butylene glycol, amylene glycol, etc., as well as trihydroxy alcohols, such as glycerol or polyhydroxy alcohols having even more than 3 hydroxyl groups, or other polyhydroxy compounds such as lower polyglycols, e. g., diethylene glycol, dipropylene glycol, triethylene glycol, hexaethylene glycol, diglycerol, etc. One may also use mixtures of these various mono-, di-, tri-, or higher hydroxy alcohols.

The catalysts which are to be used to effect the polymerization of the above-described alcohols may be of several types, although those of the Friedel-Crafts type are especially preferred, such as aluminum chloride, ferric chloride, zinc chloride, antimony chloride, antimony fluoride, stannic fluoride, boron fluoride and others. Of these, aluminum chloride is preferred. Other types of catalysts may be used such as sulfuric acid, hydrogen fluoride, activated clays, silica gel, metallic zinc, aluminum, etc., although these types are not as effective as those of the Friedel-Crafts type.

In effecting the polymerization, it is desired, although not essential, to use an inert solvent or diluent such as a refined kerosene (heavily pretreated with sulfuric acid before using), or ethylene dichloride, tetrachlorethane, etc. The amount of diluents may be from about ½ volume to 5 volumes, for each volume of the low molecular weight alcohol to be polymerized.

The amount of catalyst to be used may vary widely according to the temperature to be used, the desired speed of reaction and the degree of polymerization desired, but ordinarily it will range from about 10% to about 100% by weight of the low molecular weight alcohol starting material. In the case of polyhydroxy alcohols it may be desirable or necessary to use relatively larger proportions of catalyst than in the case of the monohydroxy alcohols, for instance, the amount of aluminum chloride to be used may range from about 50 to 200% by weight, or from about ¼ mol to 3 mols of catalyst per mol of polyhydroxy alcohol.

In carrying out the invention, the aluminum chloride or other catalyst to be used may be suspended in the solvent or diluent and then the low molecular weight alcohol to be used is gradually added with stirring, and with cooling if the reaction is very vigorous, so as to prevent the temperature of the reaction mixture from rising above about 200° F. If desired, the order of mixing the raw materials may be changed, for instance, by first mixing the alcohol with the solvent diluent and then adding the catalyst last. When carrying out the invention with polyhydroxy alcohols such as glycerol or ethylene glycol or polyethylene glycol, which materials are generally freely soluble in water and practically insoluble in the usual organic solvents, such as high boiling naphtha or kerosene or even in some of the chlorinated hydrocarbon solvents, the polyhydroxy alcohol may simply be suspended in a suitable liquid medium such as refined kerosene by stirring and then the catalyst is added. As the reaction subsides, it may be desirable to actually heat the reaction mass to a temperature between about 150° F. to 350° F. for a period of ½ to 10 hours, usually about 1 to 5 hours being sufficient, in order to insure completion of the desired polymerization reaction. At the end of the reaction, the mixture is cooled, e. g. to about 100° F., and diluted with one or two volumes of refined kerosene and then the aluminum chloride or other catalyst is decomposed by the slow addition of water. After settling, the water layer containing the decomposed aluminous sludge is drawn off and discarded. The kerosene extract may, if desired, be further washed with water, and is then distilled under reduced pressure, as with fire and steam or under vacuum (5-50 mm. mercury), to about 500° F. or 600° F. in order to remove the solvent and low boiling products. The bottoms residue constitutes the desired pour depressor products.

This polymerization product is soluble in mineral lubricating oils and has the property of depressing the pour point of waxy mineral lubricating oils when added thereto in small amounts, for instance, about 0.1% to 10.0% although usually the amount to be used ranges between about 0.5% and 5.0%. This polymerization product is also useful as a wax modifier for other purposes such as for use as a dewaxing aid for reducing the wax content of waxy oils. This polymerization product may also be used to modify the crystal structure of paraffin wax or various compositions containing large amounts of same to be used for various purposes such as for coating or impregnating paper, etc. or for making various molded wax products.

The invention will be better understood from a consideration of the following experimental data:

During the above described reaction, a vigorous evolution of hydrogen chloride gas took place, thus indicating that at least a portion of the chlorine content of the aluminum chloride catalyst was taking part in the reaction.

Another series of tests were made using polyhydroxy alcohols instead of monohydroxy alcohols. The procedure consisted in suspending the polyhydroxy alcohol in a solvent (a refined kerosene) and producing an aluminum chloride complex with the alcohol by the slow addition (about 50 grams every 10 minutes) of aluminum chloride with occasional shaking. The aluminum chloride-polyhydroxy-alcohol complex was allowed to digest under a reflux condenser for 3 to 5 hours at 300° F. and allowed to cool at room temperature by standing over night. After the addition of water to break the complex and to destroy the aluminum chloride, a kerosene extract containing the desired polymerization or autocondensation product was obtained. After the additional washing with water, the solvent and low boiling products were removed by a fire and steam distillation to 500° or 600° F. The desired products obtained as distillation resi-

TABLE I

| Test No. | Alipathic alcohol | | Solvent | | AlCl grams | Temp., °F. | Hours | Yield, grams | Product | |
|---|---|---|---|---|---|---|---|---|---|---|
| | Name | Ccs. | Kind | Ccs. | | | | | Nature | Pour point (°F.)[1] per cent product added 2 |
| 1 | Mixed amyl alcohol | 500 | Ethylene dichloride | 200 | 300 | 175 | 3 | 66 | Visc. dark green oil | −15 |
| 2 | do | 500 | Refined kerosene | 200 | 300 | 230 | 2 | 102 | do | 0 |
| 3 | do | 500 | Tetrachlorethane | 200 | 300 | 200 | 3 | 78 | do | −20 |
| 4 | Sec. amyl alcohol | 400 | do | 200 | 300 | 200 | 3 | 65 | do | −5 |
| 5 | Cyclohexanol | 500 | do | 200 | 300 | 200 | 3 | 52 | Green resin | −5 |
| 6 | Mixed amyl alcohol | 500 | Refined kerosene | 200 | 300 | 200 | 3 | 53 | Visc. dark green oil | −15 |

[1] Original oil, pour point +30°F.

In the above tests, anhydrous aluminum chloride was used. It should also be noted that in the distillation of the polymerization product it was found that a fraction of the polymerization product distilling overhead in the range of 500° F. to 600° F. could be recycled with a further quantity of aluminum chloride to give more of the desired high-boiling alcohol polymers which are useful for depressing the pour point of waxy lubricating oils.

The waxy lubricating oil having an original pour point of +30, used in the above tests was a blend of 10 volumes of bright stock and 90 parts of Manchester spindle oil.

due were soft or hard resins ranging from brown to black in color and were tested for pour depressing potency by testing 2% and 5% blends thereof in a waxy mineral lubricating oil basestock having the pour point of +30° F. The following table shows the types and amounts of polyhydroxy alcohol used as well as the reaction time allowed, description of the product and pour point tests of blends containing the product. In all of these tests 600 cc. of refined (i. e. inert) kerosene were used as solvent and 200 grams of aluminum chloride were used as catalyst, the maximum reaction temperature in that case being 300° F.

TABLE II

*Summary of data on preparation of pour depressants from glycols*

| Run No. | Reagents | | Reaction time, hours | Grams yield | Consistency and color of product | Pour tests | |
|---|---|---|---|---|---|---|---|
| | Glycol used | Amount used, grams | | | | 2% in test oil (° F.) (+30) | 5% in test oil (° F.) (+30) |
| 7 | Ethylene glycol | 200 | 3½ | 15 | Soft black | +15 | +5 |
| 8 | do | 100 | 3½ | 23 | do | +5 | −15 |
| 9 | do | 100 | 3½ | 27 | do | +10 | −10 |
| 10 | Glycerol | 200 | 5¾ | 18 | Hard black | +15 | 0 |
| 11 | do | 100 | 3¾ | 17 | Soft brown | −25 | −25 |
| 12 | Propylene glycol | 100 | 4 | 43 | Very hard black | −15 | −25 |
| 13 | Dipropylene glycol | 100 | 4 | 17 | Soft black | +5 | −10 |
| 14 | Triethylene glycol | 100 | 3 | 31 | do | −10 | −20 |
| 15 | Hexaethylene glycol | 100 | 3 | 38 | do | −15 | −25 |

The above table indicates that the various di- and trihydroxy alcohols tested can be satisfactorily polymerized to make a dark resinous product having the ability, in 2% to 5% concentrations, of reducing the pour point of a waxy mineral lubricating oil base stock from +30° F. to various temperatures such as down to +15° F., 0° F., —15° F., and even —25° F. These results are very surprising, indeed, from the point of view that the lower polyhydroxy alcohols used as raw material are in most cases insoluble in mineral oil and, in fact, quite water-soluble.

Although the exact chemical structure of the product of this invention is not known, it is believed that a small amount of oxygen originating in the hydroxy groups of the raw material still remains in the final polymerization or auto-condensation product.

It is not intended that this invention be limited to any of the specific examples which were given merely for the sake of illustration, nor to any theory as to the mechanism of the operation of the invention, but only by the appended claims in which it is intended to claim all novelty inherent in the invention as broadly as the prior art permits.

We claim:

1. A product consisting essentially of a polymerization product of an aliphatic polyhydroxy alcohol having less than 8 carbon atoms, said polymerization product being soluble in mineral oil and substantially non-volatile at about 500° F.

2. Product according to claim 1, made from a dihydroxy alcohol.

3. Product according to claim 1, made from a trihydroxy alcohol.

4. A product made by polymerizing about 1 mol glycerol in the presence of about ¼–3 mols of aluminum chloride, at a temperature ranging from about room temperature to about 350° F., said polymerization product being oil-soluble and being substantially non-volatile at temperatures up to about 500° F. and having the property of depressing the pour point of waxy mineral lubricating oils when added thereto in small amounts.

5. A process which comprises polymerizing a low molecular weight polyhydroxy alcohol in the presence of a Friedel-Crafts catalyst to obtain a polymerization product which is substantially non-volatile at about 500° F. and has the property of depressing the pour point of waxy mineral lubricating oils when added thereto in small amounts.

6. Process according to claim 5 in which a dihydroxy alcohol is used.

7. Process according to claim 5 in which a trihydroxy alcohol is used.

8. The process which comprises polymerizing about 1 mol of glycerol in the presence of about ¼ mol to 3 mols of anhydrous aluminum chloride and in the presence of an inert solvent at a temperature between the approximate limits of about room temperature and about 350° F., for a reaction time sufficient to produce a high molecular weight polymerization product which is soluble in mineral oil and has pour depressing properties, hydrolyzing and removing the catalyst, and distilling the polymerization product under reduced pressure to a temperature of at least about 500° F. to remove solvent and low boiling products, and to obtain as distillation residue the desired polymerization product soluble in mineral oil and having pour depressing properties.

9. A lubricant comprising a major proportion of a waxy mineral lubricating oil and a pour depressing amount of a polymerization product of a saturated dihydroxy alcohol having less than 8 carbon atoms, obtained by polymerizing said alcohol in the presence of a Friedel-Crafts catalyst at a temperature between about room temperature and about 350° F., said polymerization product being soluble in mineral oil and substantially non-volatile at about 500° F.

10. A lubricant comprising a major proportion of a waxy mineral lubricating oil and a pour depressing amount of a polymerization product of a saturated trihydroxy alcohol having less than 8 carbon atoms, obtained by polymerizing said alcohol in the presence of a Friedel-Crafts catalyst at a temperature between about room temperature and about 350° F., said polymerization product being soluble in mineral oil and substantially non-volatile at about 500° F.

11. A lubricant comprising a major proportion of a waxy mineral lubricating oil containing a pour depressing amount, between the approximate limits of about 0.1% and 10.0%, of a polymerization product of glycerol obtained by polymerizing about 1 mol with about ½ mol to 3 mols of aluminum chloride at a temperature between the approximate limits of room temperature and about 350° F., said polymerization product being substantially non-volatile at about 500° F. and being soluble in said waxy mineral lubricating oil.

EUGENE LIEBER.
MARVIN E. THORNER.